June 16, 1942. W. H. URE 2,286,698
METHOD OF MAKING SCREW STICKS
Original Filed Nov. 28, 1939   2 Sheets-Sheet 1

WILLIAM H. URE
INVENTOR

BY
ATTORNEYS

June 16, 1942.  W. H. URE  2,286,698
METHOD OF MAKING SCREW STICKS
Original Filed Nov. 28, 1939   2 Sheets-Sheet 2
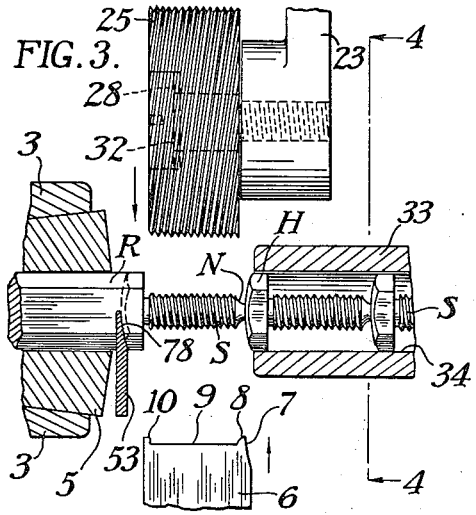
FIG. 3.
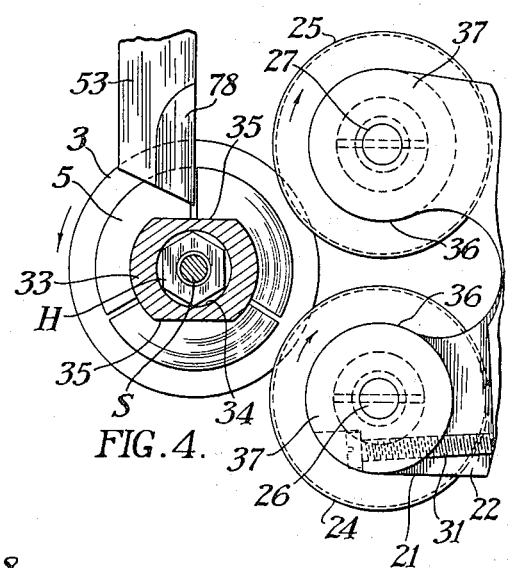
FIG. 4.
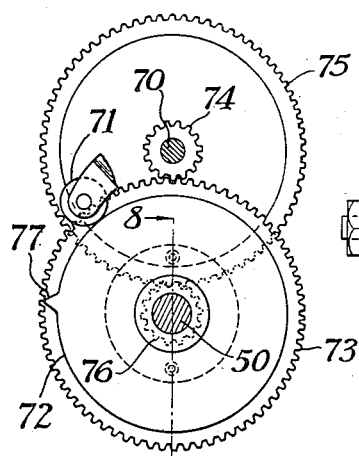
FIG. 7.   FIG. 8.
FIG. 5.
FIG. 6.
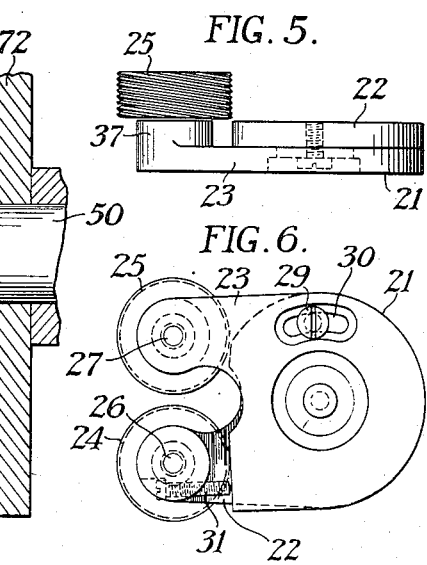
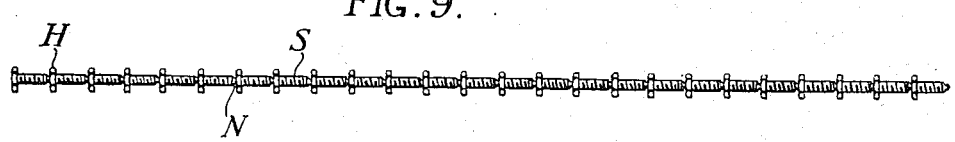
FIG. 9.
WILLIAM H. URE
INVENTOR
BY
ATTORNEYS Patented June 16, 1942

2,286,698

UNITED STATES PATENT OFFICE 2,286,698

METHOD OF MAKING SCREW STICKS

William H. Ure, Rochester, N. Y., assignor to Eastman Kodak Company, Rochester, N. Y., a corporation of New Jersey Original application November 28, 1939, Serial No. 306,506. Divided and this application May 14, 1941, Serial No. 393,383

3 Claims. (Cl. 10—10)

This application relates to a method of manufacturing a screw stick which may consist of a plurality of screws, the threaded portion of one screw being integrally attached to the head of the next adjacent screw by a narrow neck. One of the objects of my invention is to provide a method of making screw sticks of the class described by which such screw sticks may be made economically and quickly. Another object of my invention is to provide a method for manufacturing the screw sticks in which the number of individual screws included in a stick may be determined at will. Still other objects will appear from the following specification, the novel features being particularly pointed out in the claims at the end thereof.

This application contains claims which are substantial equivalents to claims divided from my copending application 306,506 for "Method and apparatus for manufacturing screw sticks," filed November 28, 1939.

Coming now to the drawings wherein like reference characters denote like parts throughout:

Fig. 3 is an enlarged fragmentary detail, partially in section, showing the screw blank forming and threading tools and their relationship to the screw stick in the process of manufacture.

Fig. 4 is an enlarged fragmentary section on line 4—4 of Fig. 3 but omitting the screw blanking tool and showing a cut-off tool.

Fig. 5 is a top plan view of the screw-threading tool.

Fig. 6 is an end elevation of the screw-threading tool.

Fig. 7 is a fragmentary side elevation, partially in section, of the reduction gearing which operates the cut-off.

Fig. 8 is a fragmentary detail section of a part of the cut-off reduction gearing and is taken on line 8—8 of Fig. 7.

Fig. 9 is a side elevation of a typical screw stick which can be made by my improved method and machine.

Figure 1:
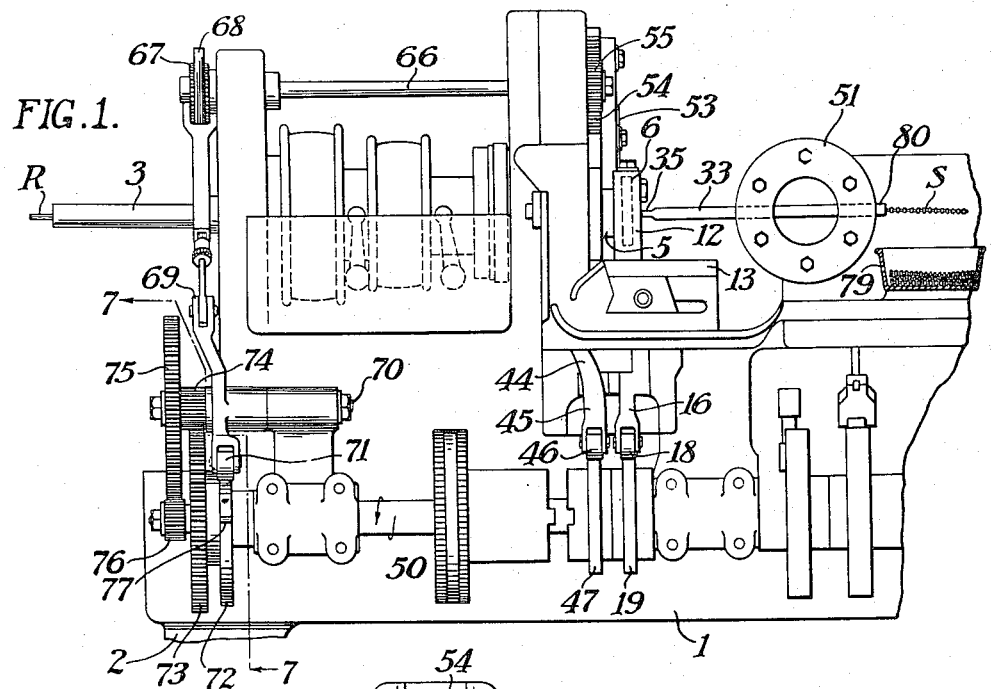
Fig. 1 is a side elevation of a machine constructed in accordance with and embodying a preferred form of my invention for manufacturing screw sticks.

It is pointed out that, in applicant's drawings, the size of the screws composing a screw stick are shown on an exaggerated scale. While the size of screws which can be made by my improved method may vary widely, I am particularly interested in providing sticks of screws which are considerably smaller than the screws shown in the accompanying drawings, since these small screws are ordinarily the most difficult screws to make in stick form. Accordingly, I have shown in the drawings screws in an enlarged form with respect to the machine which manufactures them, this being done to more clearly illustrate my invention. It will be understood, of course, that the same method of manufacture can be used for screws of widely different size and type and the dimensional features which are mentioned later in the specification are to be understood to be by way of illustration only and not as a limitation.

Referring to Fig. 1, I show a typical machine with which my method can be carried out. This may include a base 1, mounted on suitable legs 2, and having a hollow spindle 3, which may be operated from a suitable source of power. As is common in screw machines, such as the well-known Brown & Sharpe Manufacturing Company screw machine, the work spindle 3 contains work advancing and clutch mechanisms by which rod stock R may be intermittently advanced one step at a time. Since this mechanism is well known, it need not be further described herein.

The rod stock R, in the present embodiment of my invention, is hexagonal stock because the resulting heads H of the screw stick S, as shown in Fig. 9, are preferably of hexagonal shape. As indicated in Fig. 3, the rod stock R may be advanced to and may be held by a chuck 5 which is carried by the work spindle 3, so that the rod R may be rapidly rotated.

While the stock is being rotated, a shaping tool 6 is moved in the direction shown by the arrow to cut out the screw blank, the tool having a curved face 7 for shaping one side of the screw head H, a curved notching edge 8 for shaping the neck N, a flat surface 9 for shaping the screw shank S and a projecting edge 10 for shaping the opposite side of the screw head H.

Figure 2:
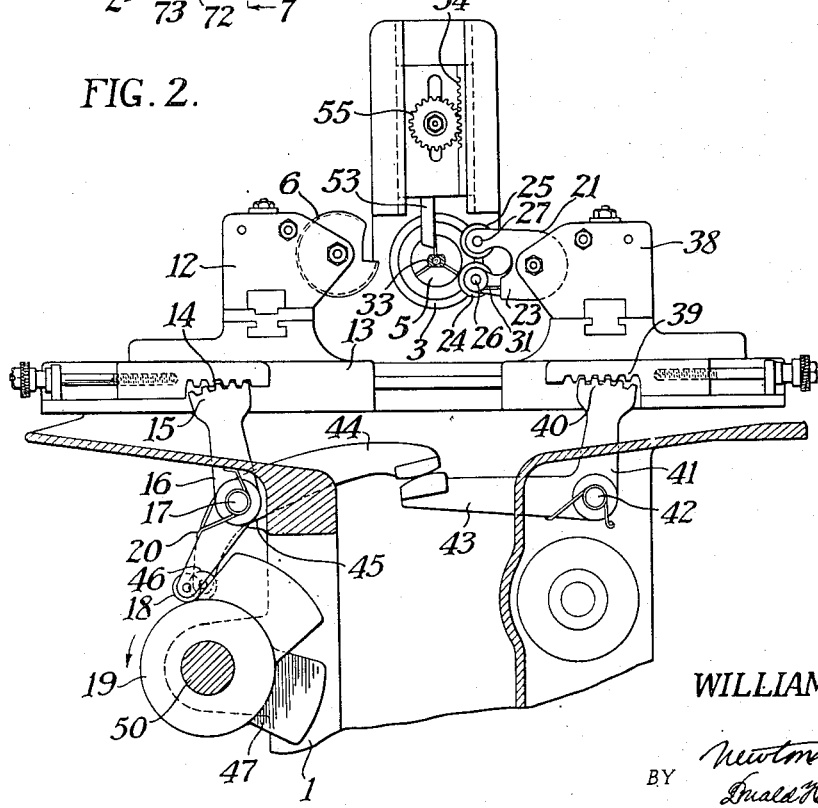
Figure 2 is an end elevation, partially in section, through the machine shown in Fig. 1.

This tool, as indicated in Fig. 2, may be fixedly attached to a bracket 12, carried by the slide 13 and including a rack 14 and gear segment 15, which, through the bell crank lever 16, pivoted at 17 and the roller 18, bearing on the cam 19, causes the tool to be advanced to blank out the screw and then to move back to its initial position under the impulse of a spring 20.

After blanking the screw, the thread is rolled onto the shank S by means of the tool shown in Figs. 5 and 6. The threading tool, designated broadly as 21, consists of two relatively adjustable arms 22 and 23, each carrying a threaded wheel 24 and 25. These wheels are mounted to rotate freely on shafts 26 and 27, and these shafts may be in the form of studs, as shown at 28, in Fig. 3. The separation between these rollers may be adjusted by the screw 29 and the slot 30, there being a set screw 31 to get a fine adjustment between the stud shafts 26 and 27. It is also desirable to permit one of the threaded wheels to move axially on its shaft a very short distance, and I find it convenient to provide the stud shaft 27 with a collar 32 which will permit slight axial movement. The wheel 24 may be mounted so as to turn upon its shaft 26, but is preferably so arranged that it may not move axially on this shaft.

As indicated in Figs. 1 and 3, after the screws are threaded, they may pass into a guiding tube 33 which has an internal diameter 34 of such size that the screws may turn as the rod stock is turned, the fit being sufficiently loose to permit free sliding movement of the screws in the tube.

As indicated in Fig. 4, the tubular member 33 is machined to flat surfaces 35 for a small portion of its length, so that the edges 36 of the hubs 37 of the threading tool will clear the tubular member and permit the rollers 24 and 25 to reach the formed shank of the screw in the work area.

The tool 21, as indicated in Fig. 2, is carried by a bracket 38 which has a rack 39 meshing with a gear segment 40 of a bell crank lever 41, pivoted at 42 and having an arm 43 engageable with a second arm 44 of a bell crank lever 45, pivoted at 17 and having a roller 46 engaging the cam 47. The cams 19 and 47 are both carried by a power shaft 50 so that as this shaft revolves, the shaping tool and the threading tools are operated in timed relation to first blank and then thread the screw. After each operation of threading and blanking, the rod stock R is automatically advanced the length of one screw, where the second operation takes place. It should be noted particularly that the screw being blanked and threaded lies adjacent a supporting chuck 5 and, in addition, the next adjacent screw which has been formed on the rod stock is supported by the tube 33. While this method of supporting the stock during the screw forming operation is perhaps always desirable, it is not necessary for certain size screws, although when extremely small screws are used, it is desirable to support the stock on both sides of that area which is being worked upon.

As a typical example of a screw which can be successfully made by my improved method I have shown one made from hexagonal stock. A forming tool may be used to profile the screw so that the shank will be finished to .052 inch in diameter. The threading tools or wheels 25 and 24 may be provided with any desirable thread, say 90 threads to the inch. When these tools are brought into contact with the .052 inch stock, the finished threads will be rolled into the stock so that the outside diameter of the threads may be .060 inch in the finished screw. In other words, as these rollers approach the screw shank, they both form the metal inwardly and outwardly from the blanked size as the metal flows into the thread of the thread forming rollers. Obviously, the screw dimensions may be varied at will within wide limits.

The diameter of the rollers can be made any desired multiple of the desired thread on the screw shank, and I have found that for the screw referred to above, it is desirable to provide a threaded roller of .630 inch diameter having 12 leads.

In carrying out my method the rod stock R is intermittently advanced, is blanked and threaded, and is advanced again into the supporting tube 33. This supporting tube may be carried by the usual turret head 51 which, however, is not used except as a support for the tube 33 which holds the screw stick in axial alignment with the rod stock R. While hexagonal stock is a convenient shape and is relatively inexpensive, any other shape of extruded stock may be used, the shape of the stock determining the shape of the screw head.

As it is desirable to produce screw sticks having a predetermined number of units, I have provided an automatic cut-off in the form of a cutting tool 53, which is automatically operated to cut off the end screw of a screw stick after a predetermined number of screws have been formed. For instance, in Fig. 9, I have shown a screw stick as consisting of 25 screws, this being a convenient number for screws of a certain size. In order to cut off the twenty-fifth screw, the cut-off tool 53 is mounted so that it may be reciprocated by means of a rack 54, operable by a pinion 55 carried by a shaft 66, which, in turn, carries a pinion 67. This pinion may be operated by a rack 68 connected to a bell crank lever 69, pivoted on a shaft 70 and carrying a roller 71, contacting with a cam 72. The cam 72 is attached to a gear 73, which meshes with a pinion 74, carried by the shaft 70 and attached to a gear 75. This gear meshes with gear 76, which is attached to the shaft 50, so that the cut-off operating projection 77 on the cam 72 will reach the roller 71 to operate the cut-off knife 53 only once for every 25 operations performed by the shaping tool 6 and the threading tool 21. Therefore, each time 25 screws have been formed on the rod stock, the cut-off tool 53 is advanced, and since this tool has a curved surface 78, the shape of the screw head H, it forms a head on the last screw of the stick. As the material is intermittently advanced, the screw sticks are shoved through the support 33 so that they may drop into a suitable receptacle 79 at the end 80 of the tubular support 33.

In carrying out my method with the machine described above, it is possible to make screws of various sizes quite rapidly and I have found that small screws of the dimensions mentioned above can readily be made one every three seconds, which is substantially the same as making individual screws for standard automatic screw machines.

It is possible, of course, to operate the machine at a higher speed when certain types of stock are being used, but for ordinary brass or nickel screws, such as are commonly used in watches, photographic shutters and other small work, I have found that the speed mentioned above is a desirable one.

It will be noticed that the method of advancing screw stock intermittently to a station which supports the screw adjacent the blanking and threading tools and by supporting the stock after the screws have been formed thereon, presents only a relatively small area of the stock which may be worked upon. This is desirable because in small diameters, the stock cannot have much inherent strength and my method of guiding the threading rollers into place additionally reduces the strains which would be placed upon the frail material.

I have found that by utilizing the above described method for making screw sticks, that very accurate threads can be produced and the screws can be held accurately to size and shape. One of the important features is that the neck portion N of the screw can be held accurately to size, which is important because in use, these screw sticks depend on the size of the neck for the firmness with which the screws are seated in the work, since such screws are used in a special type of screw driving apparatus which drives the screw entering the work through the narrow neck by the next adjacent screw head until the screw is firmly seated, after which further turning movement snaps off the neck between the driven and the driving screws. Such application of screws has many advantages because it not only insures that too much force is not applied to screws, which may strip the screw threads, but it also insures that the screw is properly seated, because otherwise, the neck cannot be snapped off.

I claim:

1. A method of manufacturing screw sticks comprising turning non-round stock between suitable supports, forming a screw blank thereon, threading the rotating shank of the screw blank, said screw blank including a narrowed neck between the threaded shank of one screw and the head of the next adjacent screw, moving the rod stock the length of one screw blank between the supports and repeating the operations until a plurality of integrally connected screws are formed.

2. A method of manufacturing screw sticks including a plurality of screws having a threaded portion of one screw connect to the head of another screw by a narrow neck which comprises intermittently moving a rotating non-round rod between supports spaced slightly greater than the length of one screw and its neck and cutting a screw blank and its neck and threading the blank at each intermittent movement and between the said supports.

3. A method of manufacturing screw sticks comprising cutting screw blanks including a screw head and a shank to be threaded on non-round rod stock, having a narrow neck between each screw blank portion to be threaded and the next adjacent screw head, and threading the screw blank portion to be threaded intermediate one screw head and the next adjacent narrow neck, moving the rod a distance equal to one screw and repeating the operation until a screw stick of the desired length is formed.

WILLIAM H. URE.